(12) United States Patent
Enokihara et al.

(10) Patent No.: US 11,984,133 B2
(45) Date of Patent: May 14, 2024

(54) OPERATION DEVICE

(71) Applicant: Sony Interactive Entertainment Inc., Tokyo (JP)

(72) Inventors: Takashi Enokihara, Tokyo (JP); Kojiro Matsuyama, Tokyo (JP); Takafumi Ogura, Tokyo (JP); Tetsuro Horikawa, Tokyo (JP); Shin Kimura, Tokyo (JP); Nobuyuki Kihara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 197 days.

(21) Appl. No.: 17/775,274

(22) PCT Filed: Oct. 29, 2020

(86) PCT No.: PCT/JP2020/040690
§ 371 (c)(1),
(2) Date: May 7, 2022

(87) PCT Pub. No.: WO2021/100437
PCT Pub. Date: May 27, 2021

(65) Prior Publication Data
US 2022/0392477 A1    Dec. 8, 2022

(30) Foreign Application Priority Data
Nov. 19, 2019  (JP) ................. 2019-209138

(51) Int. Cl.
*G10L 21/0224* (2013.01)
*A63F 13/215* (2014.01)
(Continued)

(52) U.S. Cl.
CPC .......... *G10L 21/0224* (2013.01); *A63F 13/54* (2014.09); *G06F 3/016* (2013.01);
(Continued)

(58) Field of Classification Search
None
See application file for complete search history.

(56) References Cited

U.S. PATENT DOCUMENTS 7,970,147 B2    6/2011   Mao
2005/0226431 A1  10/2005  Mao
(Continued)

FOREIGN PATENT DOCUMENTS

CN    103177718 A    6/2013
JP    05337250 A    12/1993
(Continued)

OTHER PUBLICATIONS

Notice of Reasons for Refusal for related JP Application No. 2021-558257, 6 pages, dated Apr. 10, 2023.
(Continued)

*Primary Examiner* — Qin Zhu
(74) *Attorney, Agent, or Firm* — Matthew B. Dernier, Esq.

(57) ABSTRACT

Disclosed is an operation device including an interaction member, a microphone, a control circuit, and an audio signal processing circuit. The interaction member is used for interacting with a user. The control circuit periodically acquires scan data indicating the acting status of the interaction member. The audio signal processing circuit executes a noise removal process of removing noise from a collected audio signal collected by the microphone. The control circuit periodically transmits previously acquired scan data to the audio signal processing circuit. The audio signal processing circuit executes the noise removal process by using the scan data transmitted from the control circuit.

6 Claims, 5 Drawing Sheets

(51) Int. Cl.
*A63F 13/285* (2014.01)
*A63F 13/54* (2014.01)
*G06F 3/01* (2006.01)
*G06F 3/033* (2013.01)
*G06F 3/0338* (2013.01)
*G10L 21/0208* (2013.01)
*G10L 21/0216* (2013.01)
*G10L 21/0232* (2013.01)
*H04R 1/08* (2006.01)
*H04R 3/00* (2006.01)

(52) U.S. Cl.
CPC ............ *G10L 21/0232* (2013.01); *H04R 1/08* (2013.01); *H04R 3/00* (2013.01); *G10L 2021/02082* (2013.01); *G10L 2021/02163* (2013.01)

(56) References Cited

U.S. PATENT DOCUMENTS

| | | | | |
|---|---|---|---|---|
| 2007/0021205 A1* | 1/2007 | Filer | ........................ | A63F 13/87 463/36 |
| 2009/0175462 A1 | 7/2009 | Varma | | |
| 2010/0285873 A1* | 11/2010 | Tawara | ............... | A63F 13/5258 463/31 |
| 2011/0286600 A1* | 11/2011 | Gosior | .................. | A63F 13/424 381/2 |
| 2012/0002820 A1 | 1/2012 | Leichter | | |
| 2013/0343555 A1 | 12/2013 | Yehuday | | |
| 2021/0065731 A1* | 3/2021 | Matsukawa | ........ | G10K 11/1785 |

FOREIGN PATENT DOCUMENTS

| | | |
|---|---|---|
| JP | 2007532946 A | 11/2007 |
| JP | 2008236448 A | 10/2008 |
| JP | 2013137540 A | 7/2013 |

OTHER PUBLICATIONS

Notice of Reasons for Refusal for corresponding JP Application No. 2021-558256, 8 pages, dated Apr. 10, 2023.
International Search Report for corresponding PCT Application No. PCT/JP2020/040690, 4 pages, dated Jan. 12, 2021.
International Search Report for related PCT Application No. PCT/JP2020/040689, 4 pages, dated Jan. 12, 2021.
The First Office Action for related CN Application No. 202080059961.3, 14 pages, dated Nov. 24, 2023.

* cited by examiner

OPERATION DEVICE

TECHNICAL FIELD

The present invention relates to an operation device having a microphone and to an audio signal processing method.

BACKGROUND ART

Some operation devices receiving a user's operation input include a microphone that collects a sound such as a user's voice. In some cases, such operation devices execute a noise removal process on an audio signal collected by the microphone in order to remove noise.

SUMMARY

Technical Problem

Noise to be subjected to the noise removal process may include noise generated from an operation device itself, such as an operating sound generated by a user's operation performed on an operating member included in the operation device or a mechanical sound generated by an operation of a vibration mechanism or other mechanisms built in the operation device. Sufficient studies have not been conducted to determine how to remove such noise generated from the operation device itself.

The present invention has been made in view of the above circumstances. An object of the present invention is to provide an operation device and an audio signal processing method that are able to effectively remove noise generated by the operation device itself from an audio signal collected by a microphone.

Solution to Problem

An operation device according to the present invention includes an interaction member, a microphone, a control circuit, and an audio signal processing circuit. The interaction member is used for interacting with a user. The control circuit periodically acquires scan data indicating an acting status of the interaction member. The audio signal processing circuit executes a noise removal process of removing noise from a collected audio signal collected by the microphone. The control circuit periodically transmits previously acquired scan data to the audio signal processing circuit. The audio signal processing circuit executes the noise removal process by using the scan data transmitted from the control circuit.

An audio signal processing method according to the present invention is executed by an operation device that includes an interaction member, a microphone, a control circuit, and an audio signal processing circuit. The interaction member is used for interacting with a user. The audio signal processing circuit executes a noise removal process of removing noise from a collected audio signal collected by the microphone. The audio signal processing method includes a step of causing the control circuit to periodically acquire scan data indicating an acting status of the interaction member, a step of causing the control circuit to periodically transmit previously acquired scan data to the audio signal processing circuit, and a step of causing the audio signal processing circuit to execute the noise removal process by using the scan data transmitted from the control circuit.

DESCRIPTION OF EMBODIMENTS

Embodiments of the present invention will now be described in detail with reference to the accompanying drawings.

First Embodiment

Figure 1:
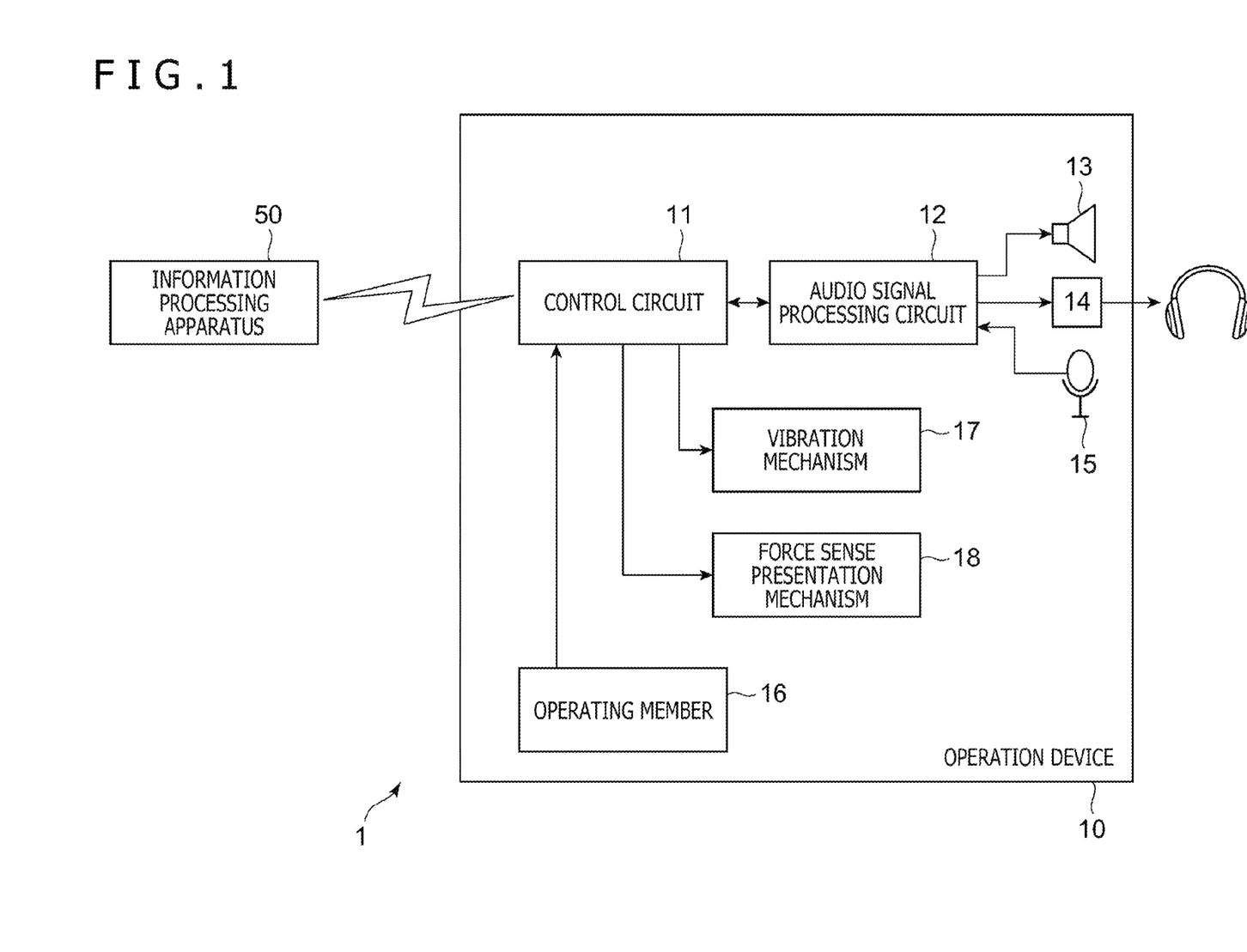
FIG. 1 is a diagram illustrating an overall configuration of an audio signal processing system that includes an operation device according to an embodiment of the present invention.
Figure 2:
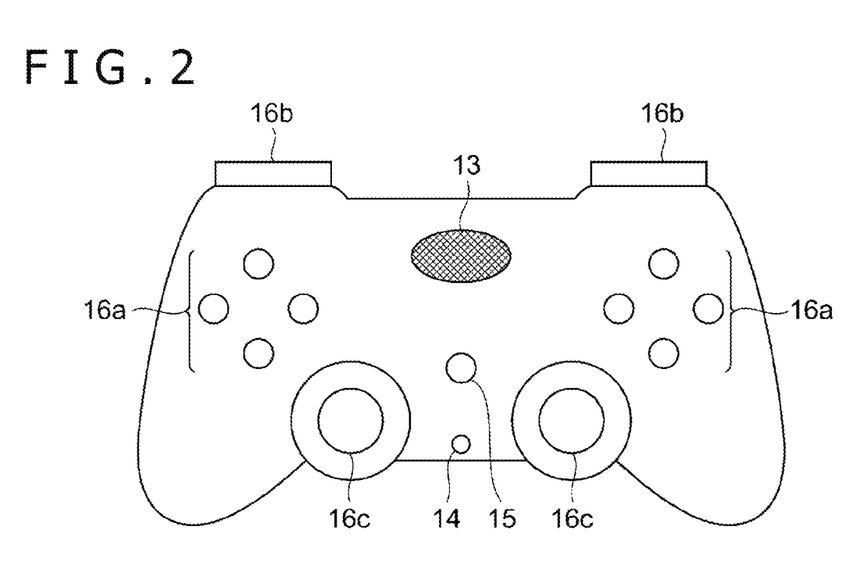
FIG. 2 is a diagram illustrating an exemplary external appearance of the operation device according to an embodiment of the present invention.

FIG. 1 is a diagram illustrating an overall configuration of an audio signal processing system 1 that includes an operation device 10 according to a first embodiment of the present invention. FIG. 2 is a diagram illustrating an exemplary external appearance of the operation device 10. As illustrated in FIGS. 1 and 2, the audio signal processing system 1 includes the operation device 10 and an information processing apparatus 50. In the first embodiment, it is assumed that the operation device 10 and the information processing apparatus 50 transmit and receive data through wireless communication based, for example, on the Bluetooth (registered trademark) standard. Although it is assumed here that the data is transmitted and received through wireless communication, this is not limitative, and the operation device 10 and the information processing apparatus 50 may alternatively be connected to each other for wired communication based, for example, on the universal serial bus (USB) standard.

The operation device 10 is, for example, a controller or the like for a home video game console, and includes a control circuit 11, an audio signal processing circuit 12, a speaker 13, a headphone terminal 14, a microphone 15, a plurality of operating members 16, a vibration mechanism 17, and a force sense presentation mechanism 18.

The control circuit 11 is a microprocessor or the like and is configured to execute a process of controlling various sections of the operation device 10. More specifically, according to a control command received from the information processing apparatus 50, the control circuit 11 outputs a control signal for operating, for example, the vibration mechanism 17 and the force sense presentation mechanism 18. Further, the control circuit 11 periodically scans the status of each of the operating members 16 to identify an operation performed by a user, and transmits an operation signal indicative of the identified operation to the information processing apparatus 50.

Further, the control circuit 11 receives a reproduction audio signal from the information processing apparatus 50, and transmits the received reproduction audio signal to the audio signal processing circuit 12. Moreover, the control circuit 11 receives a collected audio signal from the audio signal processing circuit 12, and transmits the received collected audio signal to the information processing apparatus 50. In order to permit the transmission and reception of such audio signals, the control circuit 11 and the audio signal processing circuit 12 are connected to each other for data communication based on an interface standard such as Inter-IC Sound (I2S).

The audio signal processing circuit 12 is a digital signal processor or the like and is configured to execute various signal processes on a digital audio signal. More specifically, the audio signal processing circuit 12 causes the speaker 13 or a headphone connected to the headphone terminal 14 to sound the reproduction audio signal received from the control circuit 11. Further, the audio signal processing circuit 12 executes necessary audio signal processing on the collected audio signal collected by the microphone 15, and transmits the resulting audio signal to the control circuit 11. Particularly, in the present embodiment, the audio signal processing circuit 12 executes a noise removal process on the collected audio signal by using information received from the control circuit 11. The noise removal process will be described in detail later.

The speaker 13 reproduces a sound based on the reproduction audio signal outputted from the audio signal processing circuit 12. A headphone can be connected to the headphone terminal 14. In a case where the headphone is connected to the headphone terminal 14, the audio signal processing circuit 12 is able to reproduce the sound based on the reproduction audio signal from the headphone instead of the speaker 13.

The microphone 15 collects a sound around the operation device 10, such as a voice uttered by the user of the operation device 10. It should be noted that the microphone 15 may be a microphone array formed by a plurality of microphone elements.

The plurality of operating members 16 are a kind of member for interacting with the user, and are configured to receive an operation input from the user. The operating members 16 may include various members. In the present embodiment, it is assumed that the operating members 16 include a plurality of pushbuttons 16a, a plurality of trigger buttons 16b capable of detecting the amount of depression, and a plurality of tilt operating members 16c to be tilted by the user for operating purposes.

The pushbuttons 16a are members that the user depresses for operating purposes. The trigger buttons 16b are members similar to the pushbuttons 16a in that they are depressed by the user for operating purposes. However, the trigger buttons 16b are configured such that the amount of depression (operation amount) can be measured as a numerical value. Therefore, even when, for example, the user keeps the trigger buttons 16b depressed by a small amount or quickly depresses the trigger buttons 16b all the way, the details of a depression operation performed can be identified.

The tilt operating members 16c are members protruding from the surface of the operation device 10, and are configured to be tilted 360 degrees in any direction by the user for operating purposes. The control circuit 11 detects the direction and the degree of tilt of the tilt operating members 16c. In other words, the tilt operating members 16c are also configured in such a manner that the amount of tilt can be measured as the operation amount of the user. Further, the user is able to perform an operation input for specifying the direction by moving the tilt operating members 16c.

The vibration mechanism 17 is one of the members for interacting with the user. More specifically, the vibration mechanism 17 is a device for generating a vibration, and may be various devices such as a voice coil motor. When the vibration mechanism 17 generates a vibration according to instructions from the control circuit 11, the generated vibration is transmitted to a user's hand gripping the operation device 10. It should be noted that the operation device 10 may include a plurality of vibration mechanisms 17. In such a case, the plurality of vibration mechanisms 17 included in the operation device 10 may be of different types.

The force sense presentation mechanism 18 is one of the members for interacting with the user. More specifically, the force sense presentation mechanism 18 is a device that presents a force sense to the user when, for example, the user performs an operation on the operating members 16. In the present embodiment, the force sense presentation mechanism 18 is connected to the trigger buttons 16b, and it is assumed that, in a case where the user performs an operation of depressing the trigger buttons 16b, the force sense presentation mechanism 18 presents a force sense that is oriented in a direction opposite from the direction in which the trigger buttons 16b are depressed.

Further, in the present embodiment, it is assumed that, according to instructions from the control circuit 11, the force sense presentation mechanism 18 is able to control the force sense to be presented based on the operation amount (amount of depression) of the trigger buttons 16b. In other words, the force sense presentation mechanism 18 may accordingly exercise control in order, for example, to present a force sense to the user only while the operation amount of the trigger buttons 16b is within a given value range or terminate an ongoing force sense presentation in a case where a given threshold is exceeded by the operation amount of the trigger buttons 16b.

The information processing apparatus 50 is, for example, a home video game console, a personal computer, or the like and is configured to execute various processes by using an operation signal or audio signal received from the operation device 10. Further, the information processing apparatus 50 transmits, to the operation device 10, a control command for operating the vibration mechanism 17 or the force sense presentation mechanism 18 and a reproduction audio signal for emitting a sound, for example, from the speaker 13.

The noise removal process which is executed on the collected audio signal collected by the microphone 15 will now be described. As mentioned earlier, the audio signal processing circuit 12 executes the noise removal process on the collected audio signal collected by the microphone 15 and transmits the collected audio signal, which has been subjected to the noise removal process, to the control circuit 11. The collected audio signal is further transmitted to the information processing apparatus 50 by the control circuit 11 and used for various processes.

It is possible that the collected audio signal includes noise generated by the operation device 10 itself. More specifically, it is possible that each of the members used for interacting with the user, such as the operating members 16, the vibration mechanism 17, and the force sense presentation mechanism 18, generates noise when they interact with the user. Such noise can include noise generated by a user's operation performed on the operating members 16 (for example, a sound generated when the pushbuttons 16a are depressed) and noise generated by operation of various mechanisms such as the vibration mechanism 17 and the force sense presentation mechanism 18. Such noise generated by the operation device 10 itself is hereinafter referred to as device noise.

In a situation where the operation device 10 is assumed to generate device noise, the control circuit 11 is able to grasp the situation by using, for example, the result of scanning of the operating members 16 or control signals outputted to various mechanisms. Accordingly, in the present embodiment, the control circuit 11 determines whether or not the acting status of each member for interacting with the user satisfies given determination criteria, outputs noise generation information based on the result of the determination, and transmits the noise generation information to the audio signal processing circuit 12. The given determination criteria are conditions concerning whether or not the device noise is assumed to be generated from the above-mentioned members acting as noise sources. Concrete examples of such determination criteria will be described later. The control circuit 11 determines whether each of predefined determination criteria is satisfied. In a case where it is determined that any one of the determination criteria is satisfied, the control circuit 11 transmits, to the audio signal processing circuit 12, the noise generation information indicating that one of the determination criteria is satisfied. Further, in a case where the determination criteria are not satisfied, the control circuit 11 may transmit the noise generation information indicating that the determination criteria are not satisfied. Exercising control as described above makes it possible to notify the audio signal processing circuit 12 of the timing of device noise generation and the type of device noise. By using the noise generation information received from the control circuit 11, the audio signal processing circuit 12 executes the noise removal process based on the device noise that is assumed to be generated. This further increases the accuracy of noise removal.

Figure 3:
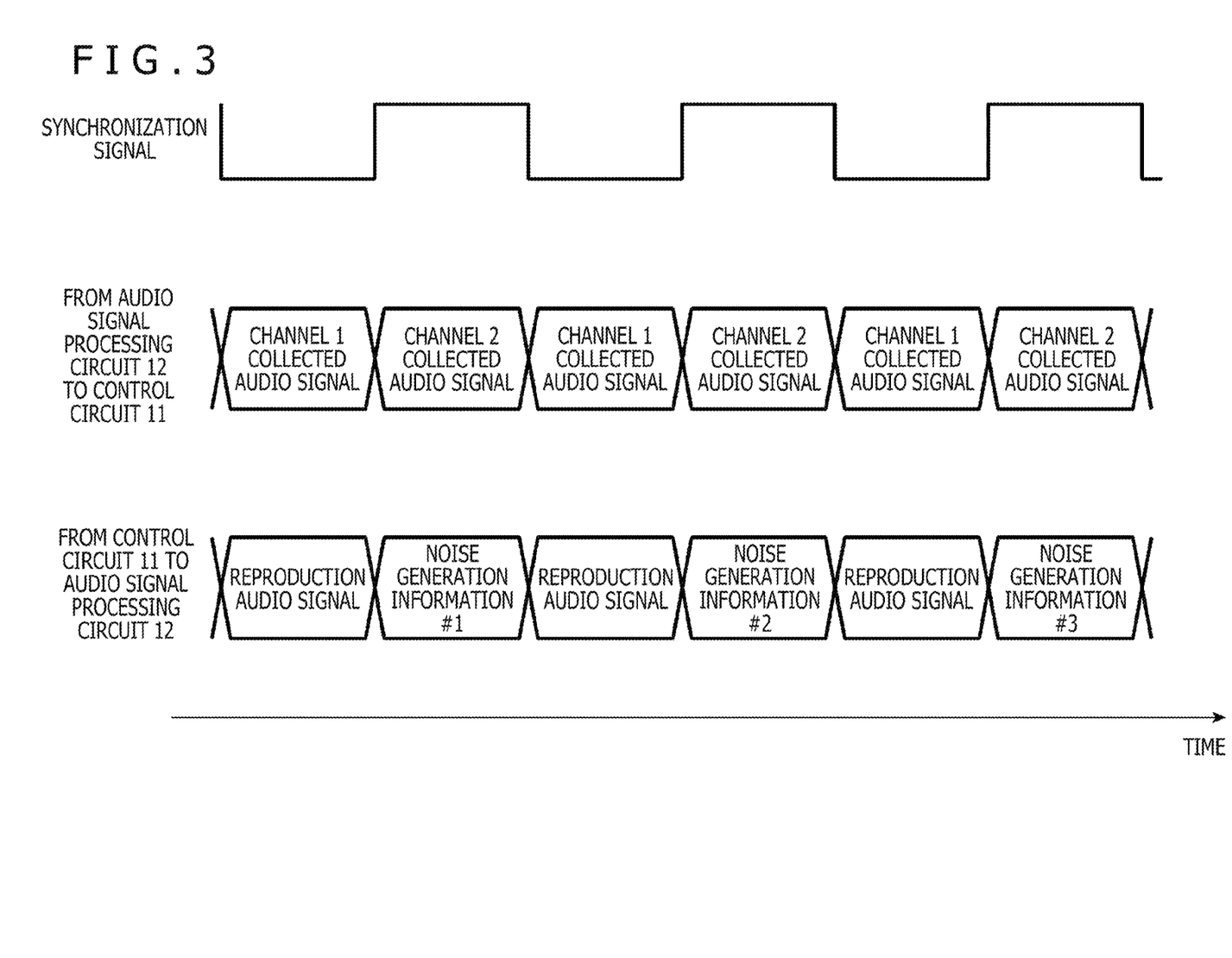
FIG. 3 is a diagram illustrating an example of data transmitted and received between a control circuit and an audio signal processing circuit.

FIG. 3 is a timing diagram that schematically illustrates data transmitted and received between the control circuit 11 and the audio signal processing circuit 12. The upper part of FIG. 3 illustrates a synchronization signal. Audio data is exchanged between the control circuit 11 and the audio signal processing circuit 12 at a timing based on the synchronization signal. The period of the synchronization signal may be decided based on the sampling rate of audio signals that are transmitted and received.

The middle part of FIG. 3 illustrates the contents of audio data that is transmitted from the audio signal processing circuit 12 to the control circuit 11. As illustrated in FIG. 3, the audio signal processing circuit 12 transmits, to the control circuit 11, data of the collected audio signal that has been subjected to various audio signal processes including the noise removal process. Here, it is assumed that the collected audio signal is two-channel stereo audio data, and that the collected audio signal on channel 1 and the collected audio signal on channel 2 are alternately transmitted according to the synchronization signal.

The lower part of FIG. 3 illustrates the contents of data that is transmitted from the control circuit 11 to the audio signal processing circuit 12. As illustrated in FIG. 3, the control circuit 11 transmits, to the audio signal processing circuit 12, data of the reproduction audio signal received from the information processing apparatus 50. Here, it is assumed that the reproduction audio signal is one-channel monaural audio data. Therefore, the amount of data of the reproduction audio signal to be transmitted is smaller by one channel than in the case of the collected audio signal. Accordingly, it is assumed that the control circuit 11 uses the resulting unoccupied channel to transmit data including the above-mentioned noise generation information. More specifically, the control circuit 11 alternately transmits a one-channel reproduction audio signal and the noise generation information. Exercising control as described above makes it possible to periodically notify the audio signal processing circuit 12 of the noise generation information by using a communication standard for audio signal transmission, such as I2S, without providing a separate communication channel.

It should be noted that the control circuit 11 does not need to update the contents of the noise generation information at time intervals equivalent to the repetition period of the synchronization signal. The control circuit 11 may update the contents of the noise generation information at longer time intervals and transmit the noise generation information at a timing at which the contents of the noise generation information are updated. Further, the control circuit 11 may transmit the contents of the noise generation information only in a case where they are changed as a result of the update, and may refrain from transmitting the noise generation information in a case where its contents are not changed. In such a case, the audio signal processing circuit 12 executes the noise removal process on the basis of the previously received contents of the noise generation information, before receiving new noise generation information. Further, the control circuit 11 does not need to simultaneously transmit the whole of the noise generation information at time intervals equivalent to the repetition period of the synchronization signal. Instead, the control circuit 11 may divide the noise generation information into segments of a given size and transmit the resulting segments one after another.

Figure 4:
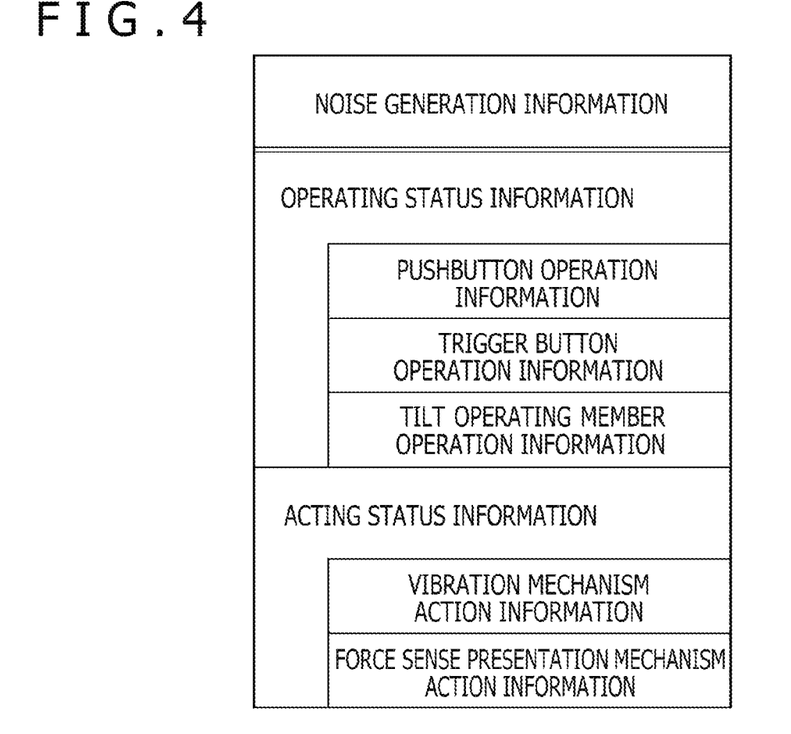
FIG. 4 is a diagram illustrating an example of noise generation information.

Detailed contents of the noise generation information and concrete examples of determination criteria for deciding the contents of the noise generation information will now be described. FIG. 4 illustrates concrete examples of information included in the noise generation information that is outputted from the control circuit 11 and transmitted to the audio signal processing circuit 12. As illustrated in FIG. 4, the noise generation information may include operating status information that is based on operation inputs to the individual operating members 16. Further, the noise generation information may include acting status information that is based on the acting status of each of various mechanisms included in the operation device 16.

The operating status information indicates determination results regarding whether or not an operation input is performed by the user. The operating status information may include information indicating which operating member 16 is operated. Further, the operating status information may include information based on the determination results regarding an operation performed on a specific operating member 16.

More specifically, the operating status information may include pushbutton operation information. The pushbutton operation information indicates that a user's depression of a pushbutton 16a is detected. The pushbutton operation information may include information indicating which of the plurality of pushbuttons 16a is depressed. The reason is that the magnitude and frequency of the device noise collected by the microphone 15 are assumed to vary depending on the type and the location of the pushbuttons 16a.

The device noise generated from the pushbuttons 16a is possibly generated at a timing at which the pushbuttons 16a are depressed. It is conceivable that the device noise is not generated while the user is depressing the pushbuttons 16a or at a timing at which the user releases his/her finger from the pushbuttons 16a. Therefore, in a case where it is detected that a pushbutton 16a left undepressed is depressed by the user, the control circuit 11 may notify the audio signal processing circuit 12 of the pushbutton operation information indicating the detection of the depressed pushbutton 16a, and subsequently may refrain from notifying the audio signal processing circuit 12 of the pushbutton operation information even in a case where it is detected that the pushbutton 16a remains depressed.

The operating status information may include trigger button operation information. The trigger button operation information indicates that the device noise is generated by a user's operation performed on the trigger buttons 16b. Here, in a case where given determination criteria are satisfied by the amount of user's operation performed on the trigger buttons 16b, the control circuit 11 may notify the audio signal processing circuit 12 of the noise generation information indicating that the given determination criteria are satisfied.

As is the case with the pushbutton operation information, the device noise is assumed to be generated particularly at a timing at which the movable parts of the trigger buttons 16b are depressed all the way. When the movable parts of the trigger buttons 16b are depressed by the maximum amount, the trigger buttons 16b collide with a restriction member in the operation device 10 in order to prevent the movable parts from being further depressed. At the timing of such a collision, a collision sound is generated. Therefore, the control circuit 11 may determine whether or not the operation amount of the trigger buttons 16b has reached the maximum value or has exceeded a given threshold near the maximum value, and at a timing at which such determination criteria are satisfied, may notify the audio signal processing circuit 12 of the trigger button operation information indicating that such determination criteria are satisfied.

Further, the operating status information may include tilt operating member operation information. The tilt operating member operation information indicates that the device noise is generated by a user's operation performed on the tilt operating members 16c. The tilt operating member operation information may also indicate that given determination criteria are satisfied by the amount of user's operation performed on the tilt operating members 16c.

Particularly, in the present embodiment, in a case where the tilt operating members 16c are tilted to the maximum in a certain direction, the tilt operating members 16c are assumed to collide with the restriction member for preventing a further operation and to generate the device noise. Therefore, in a case where it is determined that the tilt operating members 16c are operated to reach a region where it is possible that they collide with the restriction member, the control circuit 11 transmits the tilt operating member operation information indicating that the tilt operating members 16c are operated to reach such a region.

Figure 5:
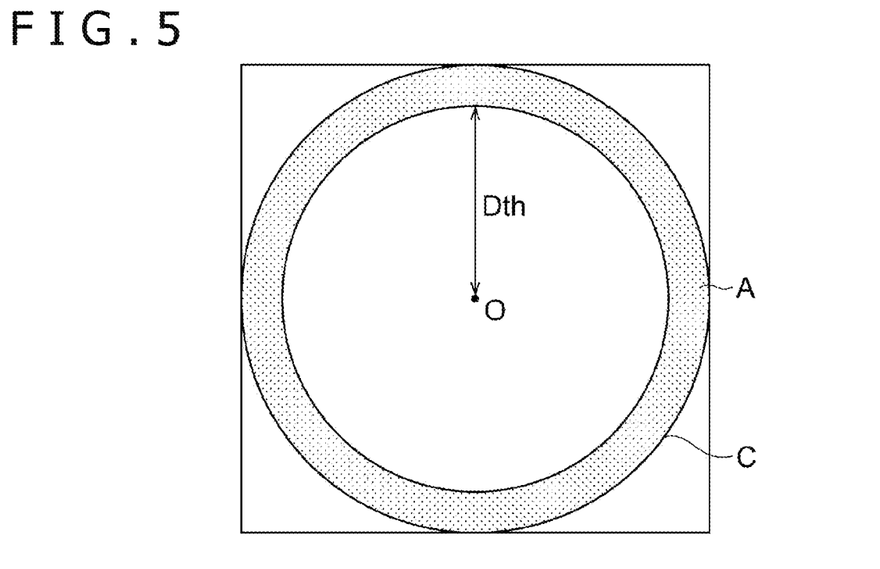
FIG. 5 is a diagram illustrating the relation between device noise and a user's operation performed on a tilt operating member.

As mentioned earlier, in the present embodiment, the tilt operating members 16c can be operated to be tilted 360 degrees in any direction. The position of a tilt operating member 16c currently operated by the user is identified by two-dimensional position coordinates. FIG. 5 is a diagram illustrating the relation between the device noise and an operation performed on a tilt operating member 16c. FIG. 5 indicates the range of values that can be taken by the two-dimensional position coordinates. The center O of a coordinate space of the two-dimensional position coordinates represents a position (neutral position) of the tilt operating member 16c that is not being operated by the user. Therefore, the direction and the distance of a detected position from the center O indicate the direction and degree of tilt of the tilt operating member 16c tilted by the user.

Here, the range of movement (operational range) of the tilt operating member 16c is restricted by the restriction member that is circular in shape and disposed around the tilt operating member 16c. Therefore, the position coordinates to be detected are limited to a range indicated by a circle C in FIG. 5. In a case where the detected position of the tilt operating member 16c is along the circumference of the circle C, it signifies that the tilt operating member 16c is tilted to the maximum and brought into contact with the restriction member. The device noise generated by the tilt operating members 16c is mainly a collision sound that is generated when the tilt operating members 16c tilted to the maximum collide with the restriction member. Consequently, only in a case where the collision sound is assumed to be generated, the control circuit 11 may transmit, to the audio signal processing circuit 12, the tilt operating member operation information indicating that the tilt operating member 16c is assumed to generate the collision sound.

More specifically, in a case where, for example, it is determined that the detected position of the tilt operating member 16c is within an outer circumferential region A shaded in FIG. 5, the control circuit 11 is supposed to notify the audio signal processing circuit 12 of such determination. The reason is that, although, when the tilt operating member 16c is positioned within the outer circumferential region A, it is possible that the tilt operating member 16c collides with the restriction member and generates the device noise, in a case where the tilt operating member 16c is positioned outside the outer circumferential region A (positioned near the center O), there is no possibility of collision between the operating member 16c and the restriction member, and therefore, the device noise generated by collision need not be taken into consideration. The outer circumferential region A is a region where the distance from the center O is greater than a threshold Dth. In other words, in the present example, in a case where the operation amount of the tilt operating member 16c is to be greater than the threshold Dth, the control circuit 11 transmits the tilt operating member operation information indicating possible noise generation. The tilt operating member operation information is transmitted at a timing satisfying such conditions, the audio signal processing circuit 12 is thus able to execute the noise removal process suitable for the device noise on the collected audio signal that is collected at the exact timing at which the device noise is generated due to collision.

Further, in a case where given determination criteria are satisfied by an operating speed in addition to the above-mentioned determination criteria concerning the operation amount, the control circuit 11 may transmit information indicating possible noise generation. In a case where the user slowly operates the tilt operating member 16c, significant noise generation is unlikely to occur due to collision with the restriction member even if the threshold Dth is exceeded by the operation amount of the tilt operating member 16c. Further, after the tilt operating member 16c collides with the restriction member and comes to a stop, noise generation due to collision is not assumed to occur. Consequently, for example, the control circuit 11 may refrain from transmitting the tilt operating member operation information indicating possible noise generation in a case where the operating speed is not higher than a threshold Vth, and may transmit the tilt operating member operation information only in a case where it is detected that the threshold Dth is exceeded by the operation amount while the threshold Vth is exceeded by the operating speed. This makes it possible to execute the noise removal process based on actual noise generation.

It should be noted that, in a case where the threshold Dth is exceeded by the operation amount and the threshold Vth is not exceeded by the operating speed, noise different from the collision sound, such as a scratch sound generated when the tilt operating member 16c rubs against the restriction member, is possibly generated. Therefore, the control circuit 11 may notify the audio signal processing circuit 12 of the tilt operating member operation information indicating such a state. In such a case, the audio signal processing circuit 12 executes a different type of noise removal process, according to the contents of the tilt operating member operation information of which the audio signal processing circuit 12 has been notified. This makes it possible to execute a more effective noise removal process.

Here, the operating speed of the tilt operating member 16c can be calculated by identifying the movement amount of the position of the tilt operating member 16c during a most recent predetermined period. For example, the control circuit 11 calculates the movement amount during the most recent predetermined period as the operating speed on the basis of changes in the position that are found by a plurality of times of sampling conducted previously. This makes it possible to determine whether or not the threshold Vth is exceeded by the operating speed.

Further, based on an operating direction (the movement direction of the position of the tilt operating member 16c), the control circuit 11 may change the contents of the tilt operating member operation information to notify of. For example, even if the threshold Dth is exceeded by the operation amount and the tilt operating member 16c is positioned near the restriction member, the tilt operating member 16c is not assumed to collide with or rub against the restriction member to generate noise in a case where the position of the tilt operating member 16c is moving toward the center O. Therefore, the control circuit 11 may transmit the tilt operating member operation information indicative of possible noise generation only in a case where it is determined that the most recent movement direction of the tilt operating member 16c is oriented in the circumferential direction (the direction toward the restriction member).

Concrete examples of the acting status information will now be described. The acting status information may include vibration mechanism action information. The vibration mechanism action information indicates the result of determination of the acting status of the vibration mechanism 17. While the vibration mechanism 17 is operating, its operating sound is assumed to be generated as the device noise. Therefore, when starting to output the control signal for operating the vibration mechanism 17, the control circuit 11 transmits, to the audio signal processing circuit 12, the vibration mechanism action information indicating that the vibration mechanism 17 starts operating at the timing of such a control signal output. Further, at a timing at which the operation of the vibration mechanism 17 is stopped, the control circuit 11 transmits the vibration mechanism action information indicating that the operation of the vibration mechanism 17 is stopped.

It should be noted that, in a case where a plurality of vibration mechanisms 17 are built in the operation device 10, the vibration mechanism action information may include information indicating which vibration mechanism 17 is operating. Further, the vibration mechanism action information may include information indicating the details of vibration, such as the intensity and the frequency of vibration that the control circuit 11 causes the vibration mechanism 17 to generate. The reason is that, for example, the magnitude and the frequency of the device noise included in the collected audio signal are assumed to vary depending on the type of the vibration mechanism 17 used for vibration generation, the location of the vibration mechanism 17 in the operation device 10, and the details of vibration to be generated.

Further, the acting status information may include force sense presentation mechanism action information. The force sense presentation mechanism action information indicates the result of determination of the acting status of the force sense presentation mechanism 18. As mentioned earlier, in the present embodiment, the force sense presentation mechanism 18 presents a force sense in response to a user's operation performed on the trigger buttons 16b. Therefore, even when the control circuit 11 receives, from the information processing apparatus 50, an instruction for controlling the operation of the force sense presentation mechanism 18, the force sense presentation mechanism 18 does not immediately start presenting a force sense. Instead, the force sense presentation mechanism 18 starts operating to present a force sense in a case where given operating conditions are satisfied by the user's operation performed on the trigger buttons 16b. Consequently, at a timing at which the control circuit 11 actually causes the force sense presentation mechanism 18 to present a force sense after determining, as a result of scanning of the user's operation performed on the trigger buttons 16b, that the conditions for operating the force sense presentation mechanism 18 are satisfied, the control circuit 11 transmits, to the audio signal processing circuit 12, the force sense presentation mechanism action information indicating that the force sense presentation mechanism 18 presents the force sense. Further, in a case where the force sense presentation by the force sense presentation mechanism 18 is terminated, the control circuit 11 transmits the force sense presentation mechanism action information indicating that the force sense presentation by the force sense presentation mechanism 18 is terminated. Moreover, the control circuit 11 may include, in the force sense presentation mechanism operation, the details of the force sense (e.g., the intensity of the force sense) to be presented.

The audio signal processing circuit 12 receives the noise generation information including the above-described contents, and changes, based on the contents, the details of the noise removal process to be applied to the collected audio signal. More specifically, while the noise generation information indicating the generation of device noise is not received, the audio signal processing circuit 12 executes a normal noise removal process irrelevant to the device noise. In a case where the audio signal processing circuit 12 has received the noise generation information indicating the depression of a pushbutton 16a, the audio signal processing circuit 12 executes the noise removal process on the collected audio signal acquired at the timing of such noise generation information reception in such a manner as to reduce the noise to be generated by the pushbutton 16a. Similarly, in a case where the audio signal processing circuit 12 has received the noise generation information indicating the maximum depression of a trigger button 16b, the audio signal processing circuit 12 executes the noise removal process of reducing the noise to be generated by the trigger button 16b. Further, in a case where the audio signal processing circuit 12 has received the noise generation information indicating the maximum tilt of a tilt operating member 16c, the audio signal processing circuit 12 executes the noise removal process of reducing the noise to be generated by the collision between the tilt operating member 16c and the restriction member.

Further, in a case where the audio signal processing circuit 12 has received the noise generation information indicating that the vibration mechanism 17 is operating, the audio signal processing circuit 12 executes the noise removal process of reducing the noise to be generated by the vibration mechanism 17. In a case where the audio signal processing circuit 12 has received the noise generation information indicating that the force sense presentation mechanism 18 is operating, the audio signal processing circuit 12 executes the noise removal process of reducing the noise to be generated by the force sense presentation mechanism 18. As described above, by using the noise generation information that is transmitted from the control circuit 11 at a timing at which device noise generation is assumed to occurs, the audio signal processing circuit 12 is able to execute in real time the noise removal process suitable for the device noise to be generated.

As described above, the operation device 10 according to the present embodiment is able to effectively remove the device noise that is to be generated by the operation device 10 itself.

It should be noted that the embodiment of the present invention is not limited to the above-described one. For example, the foregoing description assumes that the operation device 10 is a controller for a home video game console. However, the operation device 10 is not limited to such a controller, but may alternatively be various kinds of equipment that includes a microphone and an operating member to be operated by the user.

Further, the foregoing description assumes that the operation device 10 includes three types of operating members 16, namely, the pushbuttons 16a, the trigger buttons 16b, and the tilt operating members 16c. However, the operation device 10 may additionally include a touchpad and various other operating members 16. In a case where these operating members 16 possibly generate noise when operated by the user, in a manner similar to that described earlier, the control circuit 11 transmits, to the audio signal processing circuit 12, the operating member operation information indicating that the operation performed on the operating members 16 are received. Further, in addition to the vibration mechanism 17 and the force sense presentation mechanism 18, the operation device 10 may include various mechanisms that possibly generate noise. In such a case, too, in a case where the control circuit 11 operates such additional mechanisms, the control circuit 11 transmits, to the audio signal processing circuit 12, the acting status information indicating the status of such additional mechanisms. This enables the audio signal processing circuit 12 to execute a proper noise removal process.

Second Embodiment

In a case where the above-described operation device 10 according to the first embodiment of the present invention is determined to be in an operating state where noise generation possibly occurs, it is assumed that the control circuit 11 outputs noise generation information indicative of such an operating state and notifies the audio signal processing circuit 12 of the noise generation information. In other words, it is assumed that the control circuit 11 executes a noise generation determination process of determining whether or not the operation device 10 is in an operating state where noise generation possibly occurs. However, the embodiment of the present invention is not limited to such an embodiment. The operation device according to a second embodiment of the present invention will now be described by explaining about a mode in which the noise generation determination process is executed by the audio signal processing circuit 12. It should be noted that the second embodiment may be similar to the first embodiment, which has been described with reference to FIGS. 1 and 2, in the hardware configuration of the whole audio signal processing system. Therefore, various system components in the second embodiment are denoted by the same reference signs as those in the first embodiment.

In the second embodiment, the control circuit 11 periodically scans the operating state of each member of the operation device 10, and periodically transmits information indicating the result of scanning (scan data) to the information processing apparatus 50. Further, the control circuit 11 transmits the scan data to the audio signal processing circuit 12 as well at a predetermined timing. Based on the scan data received from the control circuit 11, the audio signal processing circuit 12 determines whether or not the operation device 10 is in a state where noise generation possibly occurs, and outputs the noise generation information based on the result of the determination. In other words, in the second embodiment, the audio signal processing circuit 12 executes the noise generation determination process, which is executed by the control circuit 11 according to the foregoing embodiment, and outputs the noise generation information indicating the result of the noise generation determination process. Subsequently, according to the noise generation information outputted from the audio signal processing circuit 12, the audio signal processing circuit 12 changes the details of the noise removal process that is to be executed by itself as is the case with the first embodiment. Stated differently, in the second embodiment, the audio signal processing circuit 12 exercises both the function of a noise removal section and the function of an output section.

Figure 6:
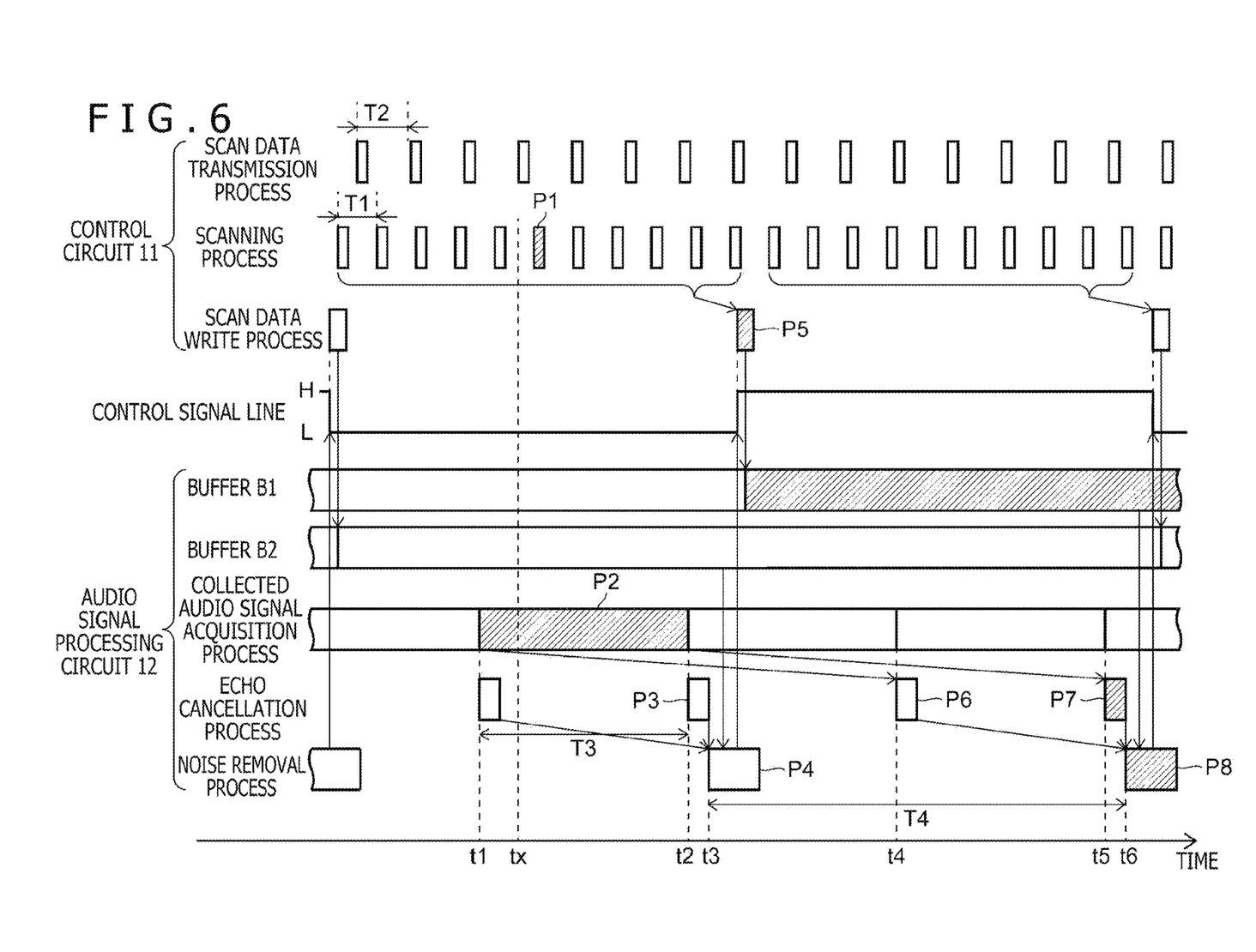
FIG. 6 is a diagram illustrating an example of processing executed by the operation device according to a second embodiment of the present invention.

Concrete examples of processes executed by the control circuit 11 and the audio signal processing circuit 12 according to the second embodiment will now be described with reference to a timing diagram of FIG. 6.

In the present embodiment, the control circuit 11 scans the status of each of the operating members 16 upon each elapse of predetermined time T1, and records the resulting data, as one piece of scan data, in a buffer memory built in the control circuit 11. Time T1 is a time interval at which a scanning process is executed. The scan data includes data indicating the acting status of each member for interacting with the user, the member being included in the operation device 10. More specifically, the scan data includes the operation information indicating a user's operation performed on each operating member 16, such as the operation information indicating whether or not the pushbuttons 16a are being depressed, the degree to which the trigger buttons 16b are depressed, and the direction and degree of tilt of the tilt operating members 16c. Further, the scan data may include information indicating the acting status of each member to be controlled by the control circuit 11, such as the vibration mechanism 17 and the force sense presentation mechanism 18.

The control circuit 11 causes the buffer memory to record not only the latest piece of scan data but also N pieces of scan data obtained by the last N scanning processes. When the scanning process is executed while N pieces of scan data are recorded, the control circuit 11 not only records the latest scan data in the buffer memory but also deletes the oldest scan data from the buffer memory.

Upon each elapse of predetermined time T2, the control circuit 11 transmits the latest scan data to the information processing apparatus 50. Time T2 is a time interval at which the scan data is transmitted to the information processing apparatus 50, and is preferably equal to or longer than time T1. By referencing the scan data received from the control circuit 11 in the operation device 10, the information processing apparatus 50 is able to grasp the status of the operation device 10 and execute a process based on a user's operation and on the acting status of each section in the operation device 10.

It should be noted that, in a case where time T2 is longer than time T1, all the scan data periodically recorded by the control circuit 11 is not always transmitted to the information processing apparatus 50. Some pieces of the scan data are not transmitted to the information processing apparatus 50, depending on the timing of recording, in some cases. However, the control circuit 11 always transmits the latest scan data (i.e., the most recently acquired scan data). Therefore, the information processing apparatus 50 is able to execute a process based on the latest status of the operation device 10.

Meanwhile, in response to a request from the audio signal processing circuit 12, the control circuit 11 simultaneously supplies, to the audio signal processing circuit 12, a plurality of pieces of scan data recorded in the buffer memory built in the control circuit 11. More specifically, at a timing determined based on a transmission request received from the audio signal processing circuit 12, the control circuit 11 writes a plurality of pieces of scan data into a buffer memory in the audio signal processing circuit 12. The transmission request will be described in detail later. In the present example, the scan data to be written into the audio signal processing circuit 12 is the whole scan data acquired subsequently to the scan data targeted for the last write. This write from the control circuit 11 to the audio signal processing circuit 12 may be implemented, for example, by communication based on the Serial Peripheral Interface (SPI) standard.

The audio signal processing circuit 12 continuously executes a collected audio signal acquisition process of converting an analog audio signal collected by the microphone 15 to a digital audio signal through the use of an analog-to-digital (AD) converter and acquiring the result of conversion as collected audio signal data. Then, upon each elapse of predetermined time T3, the audio signal processing circuit 12 executes an echo cancellation process on previously acquired collected audio signal data having a length of time T3. Time T3 is a time interval at which the echo cancellation process is executed.

Further, upon each elapse of predetermined time T4, the audio signal processing circuit 12 executes the noise removal process on the collected audio signal data on which the echo cancellation process has been executed. Time T4 is a time interval at which the noise removal process is executed. Here, it is assumed that the length of time T4 is two times the length of time T3, and that the audio signal processing circuit 12 executes a single noise removal process on the collected audio signal data that has been subjected to two previous echo cancellation processes. Although it is assumed here that time T4 is longer than time T3, time T4 and time T3 may be equal in length.

Further, at a timing at which the noise removal process is executed, the audio signal processing circuit 12 additionally requests the control circuit 11 to transmit the next scan data. In the present embodiment, it is assumed that this transmission request is made by switching between the high (H) and low (L) levels of a voltage that is outputted to a general-purpose input/output (GPIO) signal line (hereinafter referred to as a control signal line). In other words, the audio signal processing circuit 12 issues a scan data transmission request to the control circuit 11 by executing the noise removal process upon each elapse of predetermined time T4 and changing the output voltage of the control signal line during the noise removal process. Upon detecting a change in the output voltage of the control signal line, the control circuit 11 writes untransmitted scan data acquired thus far into the buffer memory in the audio signal processing circuit 12, as described earlier. Consequently, the control circuit 11 periodically executes a write process of writing the scan data into the audio signal processing circuit 12 at intervals of time T4.

It is assumed in the present embodiment that the audio signal processing circuit 12 reserves two storage areas into which the scan data is to be written, and that the control circuit 11 writes the scan data into the two storage areas alternately. This ensures that the last two pieces of scan data transmitted from the control circuit 11 are constantly recorded in the audio signal processing circuit 12. More specifically, it is assumed that two storage areas, namely, a buffer B1 and a buffer B2, are reserved in the audio signal processing circuit 12. The control circuit 11 writes the scan data into the buffer B1 when the output voltage of the control signal line is changed from L to H, and writes the scan data into the buffer B2 when the output voltage of the control signal line is changed from H to L. In this instance, old scan data recorded in a buffer at the write destination is overwritten and deleted. In the above-described configuration, by changing the output voltage of the single control signal line, the audio signal processing circuit 12 is able to not only request the control circuit 11 to write new scan data but also designate the next write destination buffer for use by the control circuit 11.

As mentioned earlier, the control circuit 11 simultaneously transmits, to the audio signal processing circuit 12, a plurality of pieces of scan data that are acquired after the last scan data transmission. Here, it is assumed as a concrete example that time T1 (a time interval at which the scanning process is executed) is 1 ms, and that time T4 (a time interval at which the noise removal process is executed) is 10.66 ms. The length of time T4 is equivalent to the length of time required for sampling 256 audio signal samples at a sampling rate of 24 kHz. In the present example, the scanning process is executed ten or eleven times during the elapse of time T4. Therefore, the control circuit 11 simultaneously transmits ten or eleven pieces of scan data to the audio signal processing circuit 12. As a result, the ten or eleven pieces of scan data are stored in each of buffers B1 and B2 within the audio signal processing circuit 12.

When executing the noise removal process, the audio signal processing circuit 12 uses the scan data that has been written by the control circuit 11 in response to a transmission request issued as a result of the last executed noise removal process. More specifically, first of all, the audio signal processing circuit 12 reads the ten or eleven pieces of scan data written last by the control circuit 11 from a buffer other than the buffer currently designated as the write destination (i.e., from the buffer designated as the write destination at the time of the last noise removal process), of the buffer B1 and the buffer B2.

Subsequently, based on the read scan data, the audio signal processing circuit 12 executes the noise generation determination process of determining whether or not the operation device 10 is in an acting state where noise generation is assumed to occur, and outputs the result of determination as the noise generation information. Then, based on details determined by the outputted noise generation information, the audio signal processing circuit 12 executes the noise removal process. The above-mentioned noise generation determination process may be similar to the process executed by the control circuit 11 in the first embodiment. Further, the noise removal process based on the noise generation information may be similar to the process executed by the audio signal processing circuit 12 in the first embodiment.

More specifically, the audio signal processing circuit 12, for example, compares the contents of operation information included in two temporally successive pieces of scan data in order to determine whether or not an undepressed pushbutton 16a has begun to be depressed. In a case where the scan data at a certain timing indicates that a certain pushbutton 16a is not depressed but the scan data acquired at the next timing indicates that the pushbutton 16a is depressed, it is determined that the pushbutton 16a is depressed at that timing at which the scan data is acquired. In such a case, it is possible that noise is generated by the depression of the pushbutton 16a at that timing. Therefore, when executing the noise removal process at a period of time corresponding to the period of time during which the read scan data is acquired, the audio signal processing circuit 12 executes the noise removal process capable of removing the noise by using, for example, a filter suitable for the noise generated by the depression of the pushbutton 16a.

Further, in a case where the acquired scan data indicates that the predetermined threshold Dth is exceeded by the operation amount of a trigger button 16b, it is assumed that the audio signal processing circuit 12 outputs the noise generation information indicating that the predetermined threshold Dth is exceeded by the operation amount of the trigger button 16b and executes the noise removal process based on the outputted noise generation information. Similarly, in a case where the acquired scan data indicates that a tilt operating member 16c is operated to reach the outer circumferential region A illustrated in FIG. 5, the audio signal processing circuit 12 determines that noise is possibly generated by the tilt operating member 16c, and executes the noise removal process based on an output generated based on the determination. Moreover, in a case where the acquired scan data indicates that the vibration mechanism 17 or the force sense presentation mechanism 18 is acting, the audio signal processing circuit 12 may execute the noise removal process based on the acquired scan data.

The following describes the flow of processing that is executed by the control circuit 11 and the audio signal processing circuit 12 in a case where a pushbutton 16a is depressed at a certain time point tx. It should be noted that, in FIG. 6, shaded parts represent processes executed on the scan data acquired immediately after the time point tx and on the collected audio signal data acquired during a period of time including the time point tx. However, the shaded part of the buffer B1 represents a period during which the scan data targeted for processing is recorded in the buffer B1.

When the pushbutton 16a is depressed at the time point tx, the scan data indicating the depression of the pushbutton 16a is generated in a scanning process P1 that is executed immediately after the depression of the pushbutton 16a.

Meanwhile, the audio signal processing circuit 12 is continuously executing the collected audio signal acquisition process as mentioned earlier. Here, it is assumed that the audio signal processing circuit 12 executes the echo cancellation process on the collected audio signal data each time 128 samples of audio signal data are acquired at a sampling rate of 24 kHz after an elapse of time T3. However, the audio signal processing circuit 12 does not immediately execute the echo cancellation process on the most recently acquired collected audio signal data, but executes the echo cancellation process with a delay equivalent to time T4 (i.e., equivalent to one time interval at which the later-described noise removal process is executed). In other words, upon each elapse of time T3, the audio signal processing circuit 12 executes the echo cancellation process on the collected audio signal data that is previously acquired during a period equivalent to time T4.

Consequently, after a collected audio signal acquisition process P2 is executed during a period between time point t1 and time point t2, the period including the time point tx, the audio signal processing circuit 12 executes an echo cancellation process P3 on the collected audio signal data previously acquired during a period that is earlier than the above-mentioned period by time T4. When the echo cancellation process P3 terminates at time t3, the audio signal processing circuit 12 then executes a noise removal process P4 on the collected audio signal data that has been targeted two times for the echo cancellation process. In this instance, the audio signal processing circuit 12 executes the noise generation determination process by using the scan data stored in the buffer B2, and changes the details of the noise removal, process according to the result of the noise generation determination process. Further, during the noise removal process P4, the audio signal processing circuit 12 requests the control circuit 11 to transmit the scan data by changing the output voltage of the control signal line from L to H. In response to such a request, the control circuit 11 executes a write process P5 of writing the scan data into the buffer B1 as a write destination. This process is executed to write, into the buffer B1 in the audio signal processing circuit 12, ten pieces of scan data that are obtained by ten most recently executed sessions of scan processing including the scanning process P1.

Subsequently, the audio signal processing circuit 12 executes a next echo cancellation process P6 at time point t4 which arrives when time T3 elapses from time point t2, and further executes an echo cancellation process P7 at time point t5 which arrives when time T3 elapses from time point t4. This echo cancellation process P7 is executed on the collected audio signal data acquired by the collected audio signal acquisition process P2.

When the echo cancellation process P7 terminates at time point t6, the audio signal processing circuit 12 then executes a noise removal process P8 on the collected audio signal data that has been subjected to the echo cancellation processes P6 and P7. In this instance, the audio signal processing circuit 12 references ten pieces of scan data stored in the buffer B1, executes the noise generation determination process, and changes the details of the noise removal process, according to the result of the noise generation determination process. In other words, the noise removal process P8 is executed on the collected audio signal data that is acquired before a timing earlier by at least time T4 than the start point of the noise removal process P8, and includes the noise generation determination process that is executed by using the scan data acquired during a period corresponding to a period during which the collected audio signal data is acquired.

As mentioned earlier, the scan data stored in the buffer B1 at a time point at which the noise removal process P8 is executed includes the scan data acquired immediately after the time point tx at which the pushbutton 16a is depressed. Therefore, in the noise removal process P8, the audio signal processing circuit 12 executes a noise removal process suitable for noise that is assumed to be generated by the depression of the pushbutton 16a. As described above, the audio signal processing circuit 12 requests the control circuit 11 to transmit the next scan data upon each elapse of time T4, and executes the noise generation determination process by using the last transmitted scan data. Then, the audio signal processing circuit 12 executes the noise removal process on the collected audio signal data acquired at a time point earlier by at least time T4. Consequently, the noise removal process suitable for noise assumed to be generated can be executed on the collected audio signal data acquired at a timing at which noise is assumed to be generated.

As described above, the operation device 10 according to the present embodiment is configured such that the audio signal processing circuit 12 which is a circuit for audio signal processing executes a noise generation information output process by using the scan data supplied from the control circuit 11. Since such a configuration is adopted, the control circuit 11 merely needs to supply the scan data (the data including operation information describing a user's operation performed on each operating member 16) generated to be transmitted to the information processing apparatus 50 to the audio signal processing circuit 12 as well. This eliminates the necessity of doubly generating the data that is to be supplied to the information processing apparatus 50 and to the audio signal processing circuit 12.

It should be noted that the time interval at which each process is executed and an interface for data exchange between the control circuit 11 and the audio signal processing circuit 12, which have been described above, are merely illustrative and not restrictive, and may be different from those described above.

REFERENCE SIGNS LIST

1: Audio signal processing system
10: Operation device
11: Control circuit
12: Audio signal processing circuit
13: Speaker
14: Headphone terminal
15: Microphone
16: Operating member
16a: Pushbutton
16b: Trigger button
16c: Tilt operating member
17: Vibration mechanism
18: Force sense presentation mechanism
50: Information processing apparatus

The invention claimed is:

1. An operation device comprising:
an interaction member that is used for interacting with a user;
a microphone;
a control circuit that periodically acquires scan data indicating an acting status of the interaction member; and
an audio signal processing circuit that executes a noise removal process of removing noise from a collected audio signal collected by the microphone,
wherein the control circuit periodically transmits previously acquired scan data to the audio signal processing circuit, and
the audio signal processing circuit executes the noise removal process by using the scan data transmitted from the control circuit.

2. The operation device according to claim 1, wherein
the operation device is connected to an information processing apparatus, and
the control circuit transmits, to the information processing apparatus, a most recently acquired piece of the scan data acquired at predetermined scanning intervals, and transmits, to the audio signal processing circuit, a plurality of pieces of the scan data that are still not transmitted to the audio signal processing circuit, at intervals longer than the predetermined scanning intervals.

3. The operation device according to claim 1, wherein
the audio signal processing circuit executes the noise removal process on previously acquired collected audio signals at predetermined time intervals, and
the control circuit transmits the scan data to the audio signal processing circuit at the predetermined time intervals.

4. The operation device according to claim 3, wherein
the audio signal processing circuit requests the control circuit to transmit the scan data upon each execution of the noise removal process, and,
upon each receipt of a request from the audio signal processing circuit, the control circuit transmits, to the audio signal processing circuit, a plurality of pieces of the scan data that are still not transmitted to the audio signal processing circuit.

5. The operation device according to claim 4, wherein, when executing the noise removal process, the audio signal processing circuit requests the control circuit to transmit new scan data, and executes the noise removal process by using a plurality of pieces of the scan data that are transmitted by the control circuit according to a request issued at a time of the last execution of the noise removal process.

6. An audio signal processing method that is executed by an operation device including an interaction member used for interacting with a user, a microphone, a control circuit, and an audio signal processing circuit that executes a noise removal process of removing noise from a collected audio signal collected by the microphone, the audio signal processing method comprising:
causing the control circuit to periodically acquire scan data indicating an acting status of the interaction member;
causing the control circuit to periodically transmit previously acquired scan data to the audio signal processing circuit; and
causing the audio signal processing circuit to execute the noise removal process by using the scan data transmitted from the control circuit.

* * * * *